US009821453B2

(12) United States Patent
Lee

(10) Patent No.: US 9,821,453 B2
(45) Date of Patent: Nov. 21, 2017

(54) LINE SCRIBING METHOD OF LINE SCRIBER

(71) Applicant: Hsien-Cheng Lee, Taipei (TW)

(72) Inventor: Hsien-Cheng Lee, Taipei (TW)

(*) Notice: Subject to any disclaimer, the term of this patent is extended or adjusted under 35 U.S.C. 154(b) by 161 days.

(21) Appl. No.: 14/878,773

(22) Filed: Oct. 8, 2015

(65) Prior Publication Data

US 2016/0114476 A1     Apr. 28, 2016

(30) Foreign Application Priority Data

Oct. 27, 2014   (TW) ............................. 103136937 A

(51) Int. Cl.
*B25H 7/04* (2006.01)
*E01C 23/16* (2006.01)
*G05D 1/02* (2006.01)

(52) U.S. Cl.
CPC ............... *B25H 7/04* (2013.01); *E01C 23/16* (2013.01); *G05D 1/0278* (2013.01); *G05D 2201/0202* (2013.01)

(58) Field of Classification Search
CPC ...... E01C 23/163; E01C 23/206; E01C 23/22; E01C 23/166; E01C 23/20; E01C 23/222
USPC .......................................................... 33/18.1
See application file for complete search history.

(56) References Cited

U.S. PATENT DOCUMENTS

| 6,074,693 | A  | * | 6/2000  | Manning ................ B05B 12/12 118/697 |
| 8,467,968 | B1 | * | 6/2013  | Dolinar .................. G01C 15/04 701/439 |
| 2004/0233242 | A1 | * | 11/2004 | Patton ........................ B41J 3/28 347/14 |
| 2005/0081783 | A1 | * | 4/2005  | Hong ...................... E01C 23/22 118/207 |
| 2013/0184938 | A1 | * | 7/2013  | Dolinar .................. G01C 15/02 701/41 |
| 2013/0190981 | A1 | * | 7/2013  | Dolinar .................. B60R 11/04 701/41 |
| 2016/0114476 | A1 | * | 4/2016  | Lee ......................... B25H 7/04 33/18.1 |

\* cited by examiner

*Primary Examiner* — Yaritza Guadalupe-McCall
(74) *Attorney, Agent, or Firm* — Ming Chow; Sinorica, LLC

(57) ABSTRACT

A line scribing method of a line scriber includes the steps of providing an electronic map; planning a line scribing path on the electronic map; converting the planned line scribing path into a plurality of planned geographical coordinates; transmitting the planned geographical coordinates to a line scriber; positioning a location to be scribed by the line scriber via a satellite connection to generate a positioning coordinate; comparing the positioning coordinate with an starting geographical coordinate of the planned geographical coordinates, and correcting the planned geographical coordinates according to the difference between the positioning coordinate and the starting geographical coordinate if the positioning coordinate is unequal to the starting coordinate, or moving the line scriber according to the planned geographical coordinates sequentially to perform a line scribing operation if the positioning coordinate is equal to the starting coordinate, so that the line scriber can perform a line scribing operation accurately.

7 Claims, 5 Drawing Sheets

LINE SCRIBING METHOD OF LINE SCRIBER

The current application claims a foreign priority to application number 103136937 filed on Oct. 27, 2014 in Taiwan.

FIELD OF THE INVENTION

The present invention relates to the field of line scribing, in particular to a line scribing method of a line scriber capable of scribing a line accurately.

BACKGROUND OF THE INVENTION

In a conventional road scribing method, a line scribing operation is performed manually, thus not just taking much time only, but also having a safety concern to those responsible for scribing the road lines.

To overcome the aforementioned problem, a line scriber is usually used to scribe the lines. Before a line scribing operation takes place, an electronic map is provided to plan a line scribing path, and then the line scribing path is converted into a plurality of line scribing path coordinates and transmitted to the line scriber, and finally the line scriber is installed at a location to be scribed, and a line scribing operation is performed. However, after the line scriber is installed at the location to be scribed, the line scriber is often deviated from the line scribing path coordinates, and it is necessary to correct the line scriber before performing the line scribing operation. Obviously, such conventional line scriber wastes time.

In addition, the deviation of the conventional line scriber is generally overcome by using an extension rod. For instance, if the line scriber is deviated from the line scribing path coordinates by one meter, then an extension rod with a length of one meter is used to solve the deviation problem. However, the method of using the extension rod to overcome the deviation problem still has the following issues. With reference to FIG. 1 for the top view of performing a line scribing operation of a road at a cliff edge by using a conventional line scriber, if a line scribing path L1 is deviated from an actual path L2 to a position off the cliff, then the line scriber will be unable to move further to reach the desired position, and the line scribing operation cannot be performed. In other words, if the line scriber keeps moving along the actual path L2, the line scriber will fall off the cliff.

Therefore, it is a main subject of the present invention to provide a line scribing method of a line scriber that can scribe a line quickly and accurately and can be used at most locations to be scribed.

SUMMARY OF THE INVENTION

It is a primary objective of the present invention to provide a line scribing method of a line scriber that can scribe a line quickly and accurately and can be used at most locations to be scribed.

To achieve the aforementioned and other objectives, the present invention provides a line scribing method of a line scriber, comprising the following steps: (S101) Provide an electronic map. (S103) Plan a line scribing path on the electronic map. (S105) Convert the planned line scribing path into a plurality of planned geographical coordinates. (S107) Transmit the planned geographical coordinates to a line scriber. (S109) Position a location to be scribed by the line scriber via a satellite connection to generate a positioning coordinate. (S111) Compare the positioning coordinate with a starting geographical coordinate of the planned geographical coordinates, and execute the steps (S113) and (S115) if the positioning coordinate is unequal to the starting coordinate, or execute the step (S115) directly if the positioning coordinate is equal to the starting coordinate. (S113) Correct the planned geographical coordinates according to the difference between the positioning coordinate and the starting geographical coordinate. (S115) Move the line scriber according to the planned geographical coordinates sequentially to perform a line scribing operation.

In the aforementioned method, the step (S115) further comprises the following steps: (S115a) Compare a line scriber geographical coordinate of the line scriber with a corresponsive planned geographical coordinate anytime while the line scriber is moving, and execute the steps (S115b) and (S115c) if the line scriber geographical coordinate is unequal to the planned geographical coordinate, or execute the step (S115c) directly if the line scriber geographical coordinate is equal to the planned geographical coordinate. (S115b). Correct the moving direction of the line scriber according to the difference between the line scriber geographical coordinate and the corresponsive planned geographical coordinate. (S115c) Move the line scriber according to the planned geographical coordinates sequentially to perform a line scribing operation.

In the aforementioned method, the steps (S01), (S03), and (S05) are executed by a line scribing path planning host system.

In the aforementioned method, the step (S07) performs the transmission operation via a wireless transmission method.

In summation, the line scribing method of a line scriber of the present invention can scribe a line quickly and accurately and can be used at most locations to be scribed.

DESCRIPTION OF THE PREFERRED EMBODIMENTS

The aforementioned and other objects, characteristics and advantages of the present invention will become apparent with the detailed description of the preferred embodiments and the illustration of related drawings as follows.

Figure 2:
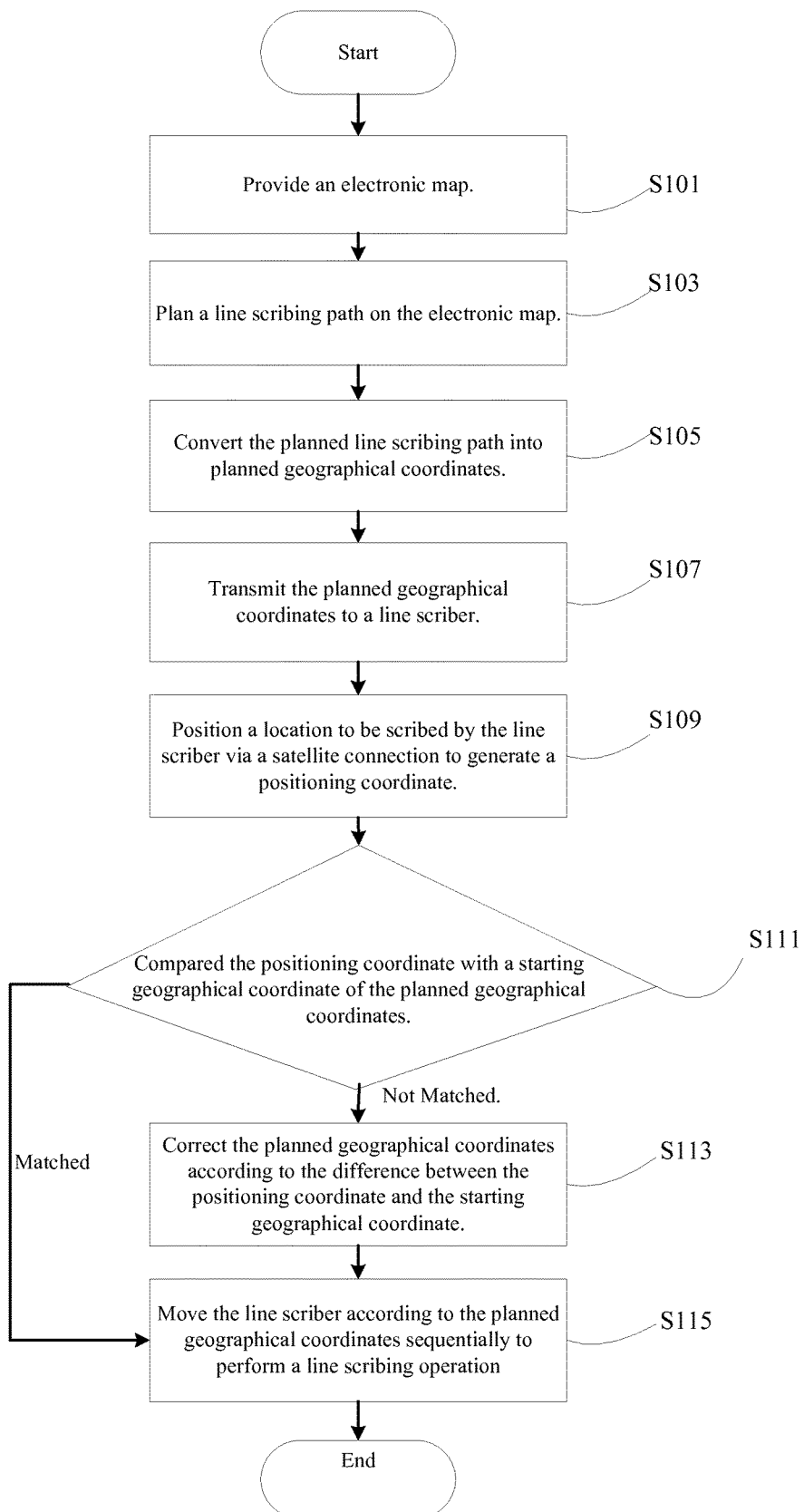
FIG. 2 is a flow chart of a line scribing method of a line scriber in accordance with the present invention.

With reference to FIG. 2 for a flow chart of a line scribing method of a line scriber in accordance with the present invention, the line scribing method comprises eight steps as described below, and the method of manufacturing an arc casing is described together with the illustration of FIG. 2.

In Step (S101), an electronic map is provided for a line scribing path planning host system, wherein the electronic map is downloaded to the line scribing path planning host system in advance or transmitted to the line scribing path planning host system via satellite directly.

Figure 3:
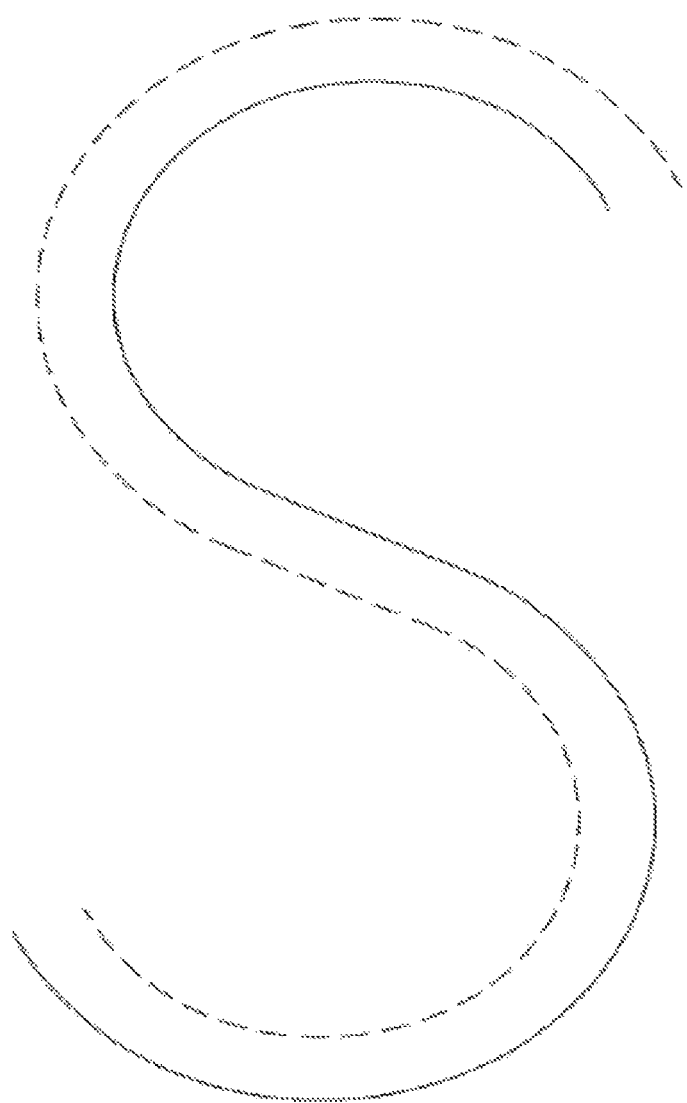
FIG. 3 is a schematic view showing the relation between a walking path and a line scribing path of a line scriber in accordance with the present invention.

In Step (S103), the line scribing path planning host system plans a line scribing path on the electronic map. For example, when a user decides to scribe a pattern formed by a straight line or a curve at a certain location to be scribed on earth, the user located the corresponsive position of the location to be scribed from the map first, and then plans the line scribing path by graphic software. Wherein, the line scribing path planning may include a walking path of the line scriber, and a line scribing path of the line scriber. It is noteworthy that the walking path is a path moving from a starting point which is the center of the machine body of the line scriber, and the line scribing path is a path moving from a starting point which is a line scribing portion of the line scriber. For example, if the line scribing path is S-shaped (as shown by a solid line portion in FIG. 3), the walking path (as shown by a dotted line portion in FIG. 3) will be planned along an edge of the line scribing path.

In Step (S105), a processing system of the line scribing path planning host system converts the planned line scribing path into a plurality of planned geographical coordinates. Wherein, the planned geographical coordinates are satellite coordinates corresponsive to the location to be scribed.

In Step (S107), the line scribing path planning host system transmits the planned geographical coordinates to the line scriber via wireless transmission or cable transmission. Wherein, the wireless transmission includes network transmission, Bluetooth transmission or infrared transmission, and the wireless transmission is relatively more convenient for the transmission operation.

In Step (S109), after the line scriber is set at the location to be scribed and positioned by the satellite connection, the position of the line scriber is located, and a set of positioning coordinates is generated. Wherein, the positioning coordinates are used to find out the starting position of the line scriber and the starting position of a line scribing operation.

In Step (S111), the positioning coordinate is compared with a starting geographical coordinate of the planned geographical coordinates. If they are equal, then Steps (S113) and (S115) will be executed, or else Step (S115) will be executed directly. Wherein, the comparison is executed by the line scriber in the Step (S111).

Figure 4A:
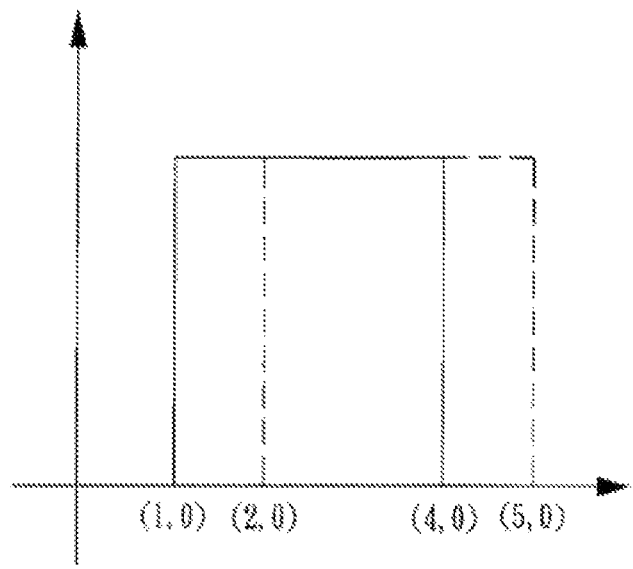
FIGS. 4a and 4b are schematic views of Step (S113) of a line scribing method of a line scriber in accordance with the present invention.
Figure 4B:
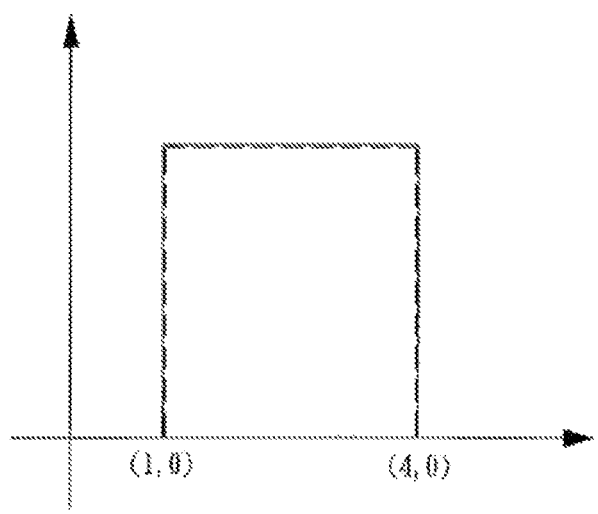

In Step (S113), the planned geographical coordinates are corrected according to the difference between the positioning coordinate and the starting geographical coordinate. For example, the dotted line portion as shown in FIG. 4a shows an n-shaped path formed by the planned geographical coordinates, and the starting geographical coordinate is represented by (2,0), and the solid line portion is the user's expected line scribing path of the line scriber, and the positioning coordinate is represented by (1,0). After the comparison takes place, the difference between the positioning coordinate and the starting geographical coordinate is found to be (1,0), so that all planned geographical coordinates are corrected to (X-1,Y). In other words, the corrected starting geographical coordinate is represented by (1,0) as shown in FIG. 4b, so that the dotted line portion and the solid line portion are superimposed with each other. If the comparison is taken place at the line scriber in Step (S111), then the correction will also be taken place at the line scriber in Step (S113).

In Step (S115), the line scriber is moved according to the planned geographical coordinates sequentially to perform a line scribing operation. In other words, the line scriber is moved according to the dotted line portion of FIG. 4b to perform a line scribing operation.

The line scribing path planning host system executes Steps (S101) to (S105) and then transmits the result to the line scriber in Step (S107). However, the invention is not limited to such arrangement only, and the line scriber may execute Steps (S101) to (S105) and skip Step (S107). In addition, the comparison operation is performed in Steps (S111) and (S113) and the correction operation is performed at the line scriber. However, the invention is not limited to such arrangement only, and the positioning coordinate may be transmitted to the line scribing path planning host system to perform the comparison operation, and the corrected planned geographical coordinate generated after the correction operation is transmitted back to the line scriber.

Figure 1:
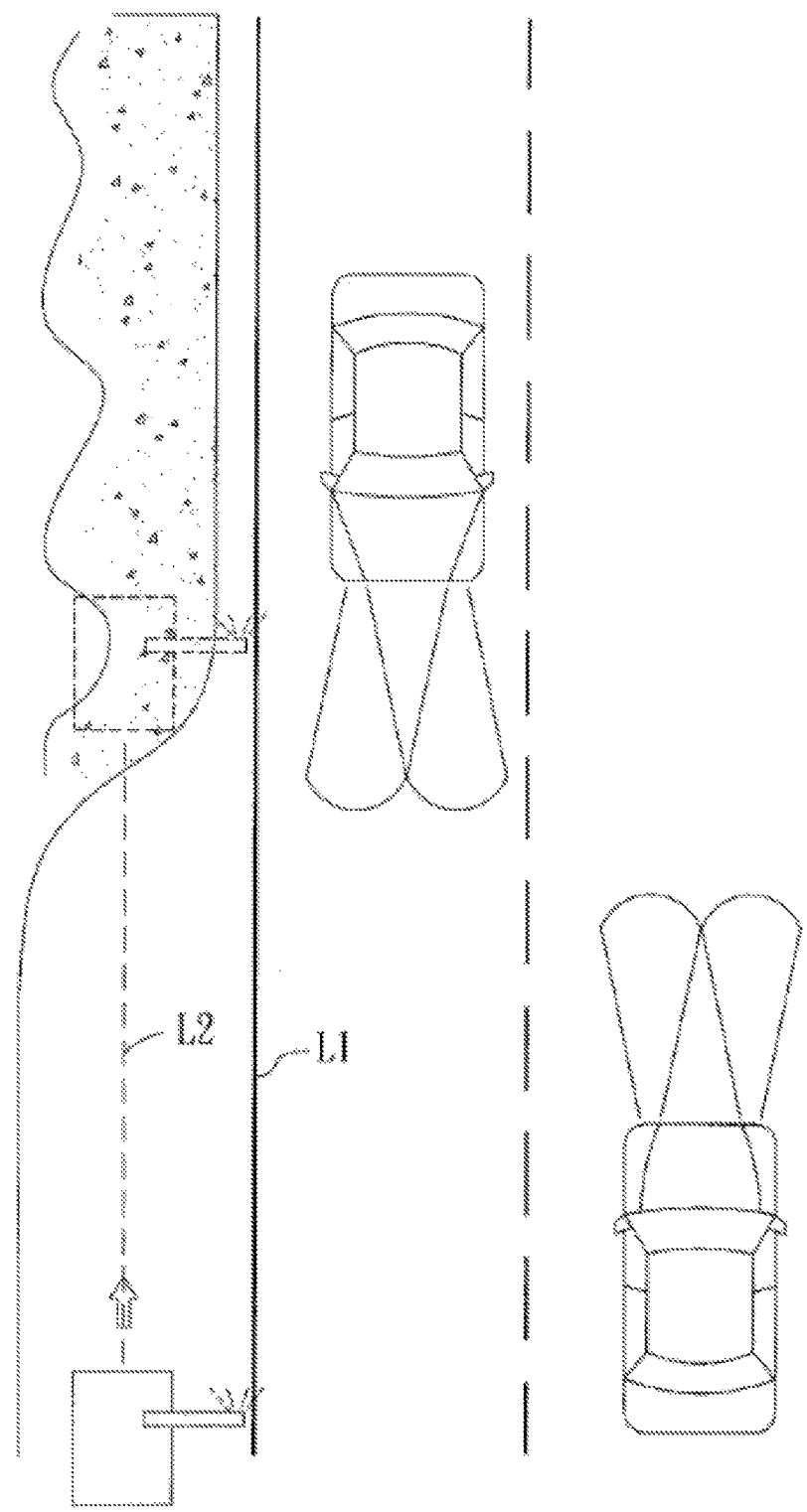
FIG. 1 is a top view of performing a line scribing operation of a road at a cliff edge by a conventional line scriber.

In summation of the description above, the line scribing method of a line scriber in accordance with the present invention scribes a line quickly and accurately through the aforementioned steps. If the positioning coordinate and the starting geographical coordinate are deviated, the planned geographical coordinates will be corrected directly, and the line scriber will be moved according to the corrected planned geographical coordinates sequentially to perform a line scribing operation, so that the line scriber no longer has the situation as shown in FIG. 1. With the line scribing method of a line scriber in accordance with the present invention line, the line scriber can be used at most locations to be scribed.

Figure 5:
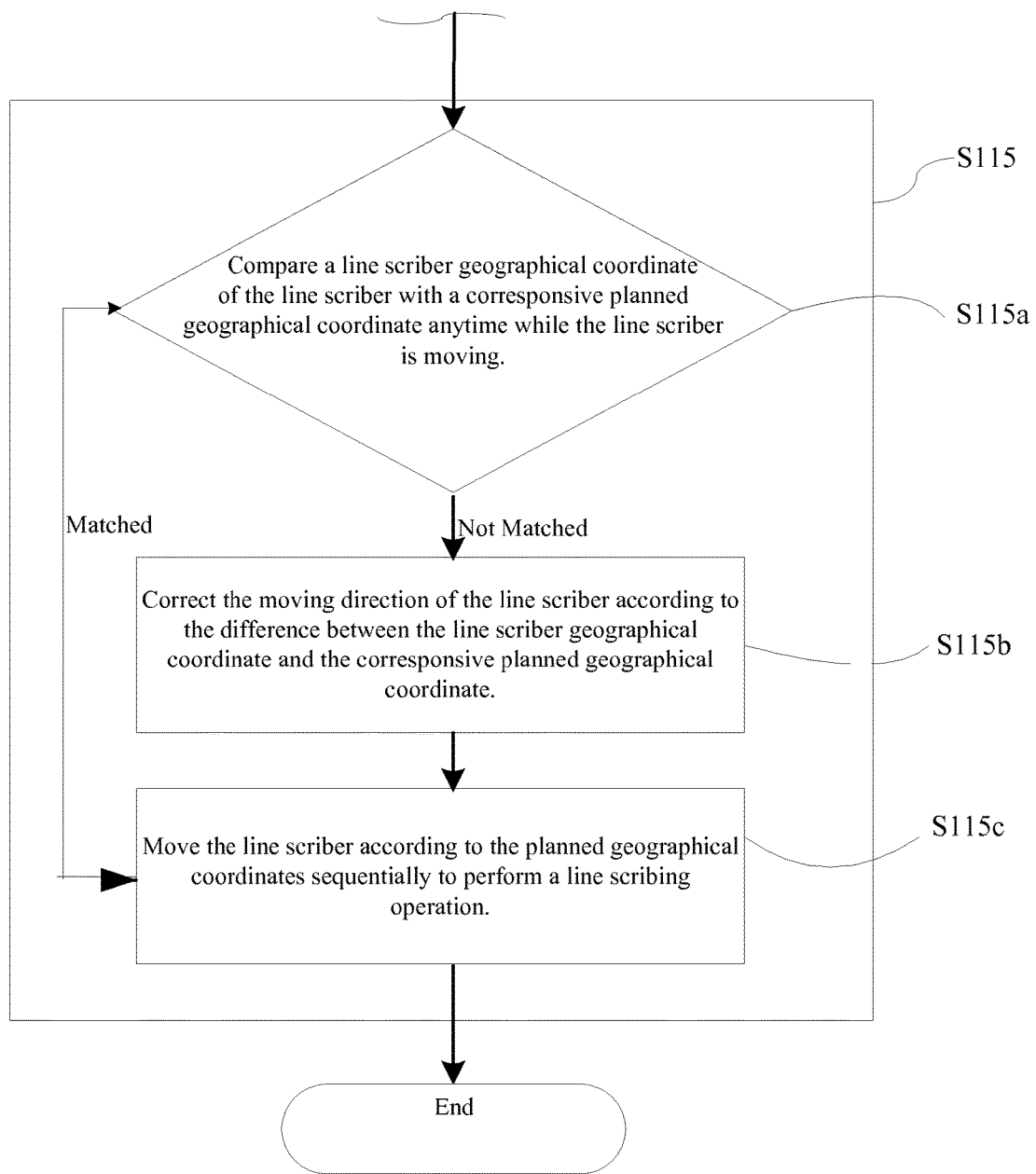
FIG. 5 is a flow chart of Steps (S115a~S115c) of a line scribing method of a line scriber in accordance with the present invention.

In Step (S115) as shown in FIG. 5, this step further comprises three steps. When the line scriber is moved and deviated from the planned geographical coordinate, the moving direction of the line scriber is corrected immediately to avoid scribing a skew line.

After Step (S113) is executed, Step (S115a) will be executed. When the line scriber is moved, a line scriber geographical coordinate of the line scriber is compared with a corresponsive planned geographical coordinate anytime. If they are unequal, then the Steps (S115b) and (S115c) will be executed, or else the Step (S115c) will be executed directly. Wherein, the comparison takes place at the line scriber in Step (S115a).

In Step (S115b), the moving direction of the line scriber is corrected according to the difference between the line scriber geographical coordinate and the corresponsive planned geographical coordinate. For example, if the line scriber should be moved sequentially to the planned geographical coordinates (1,4) and (1,5), but the line scriber is moved to the line scriber geographical coordinates (0,4) due to an uneven ground or any other factor, then the comparison will be executed immediately to find out the difference between the line scriber geographical coordinate and the corresponsive planned geographical coordinate in order to correct the moving direction of the line scriber immediately. Therefore, the line scriber can be moved to the planned geographical coordinate (1,5). Wherein, the correction operation executed in Step (S115b) takes place at the line scriber.

In Step (S115c), the line scriber is moved according to the planned geographical coordinates sequentially to perform a line scribing operation.

Although the comparison operation is executed in Steps (S115a) and (S115b) and the correction operation is executed at the line scriber, the present invention is not limited to such arrangements only, and the line scriber geographical coordinate may be transmitted to the line scribing path planning host system to perform the comparison operation and the correction operation to generate a correction signal, and then the correction signal is transmitted to the line scriber to correct the moving direction of the line scriber immediately.

In summation of the description above, the line scribing method of a line scriber in accordance with the present invention scribes a line quickly and accurately through the aforementioned steps. If the positioning coordinate and the starting geographical coordinate are deviated, the planned geographical coordinates will be corrected directly, so that the line scriber will be moved according to the corrected planned geographical coordinates sequentially to perform a line scribing operation. Therefore, the line scriber no longer has the situation as shown in FIG. 1. With the line scribing method of a line scriber in accordance with the present invention, the line scriber can be used at most locations to be scribed. In addition, if the line scriber is moved and deviated from the planned geographical coordinates, the moving direction of the line scriber will be corrected immediately to avoid scribing a skew line.

While the invention has been described by means of specific embodiments, numerous modifications and variations could be made thereto by persons skilled in the art without departing from the scope and spirit of the invention set forth in the claims.

What is claimed is:

1. A line scribing method of a line scriber, comprising the steps of:
    (S101) providing an electronic map;
    (S103) planning a line scribing path on the electronic map;
    (S105) converting the planned line scribing path into a plurality of planned geographical coordinates;
    (S107) transmitting the planned geographical coordinates to a line scriber;
    (S109) positioning a location to be scribed by the line scriber via a satellite connection to generate a positioning coordinate;
    (S111) comparing the positioning coordinate with an starting geographical coordinate of the planned geographical coordinates, and executing the steps (S113) and (S115) if the positioning coordinate is unequal to the starting coordinate, or executing the step (S115) directly if the positioning coordinate is equal to the starting coordinate;
    (S113) correcting the planned geographical coordinates only according to the difference between the positioning coordinate and the starting geographical coordinate; and
    (S115) moving the line scriber according to the planned geographical coordinates sequentially to perform a line scribing operation.

2. The line scribing method according to claim 1, wherein the step (S115) further comprising:
    (S115a) comparing a line scriber geographical coordinate of the line scriber with a corresponsive planned geographical coordinate anytime while the line scriber is moving, and executing the steps (S115b) and (S115c) if the line scriber geographical coordinate is unequal to the planned geographical coordinate, or executing the step (S115c) directly if the line scriber geographical coordinate is equal to the planned geographical coordinate;
    (S115b) correcting the moving direction of the line scriber according to the difference between the line scriber geographical coordinate and the corresponsive planned geographical coordinate; and
    (S115c) moving the line scriber according to the planned geographical coordinates sequentially to perform a line scribing operation.

3. The line scribing method according to claim 2, wherein the steps (S101), (S103), and (S105) are executed by a line scribing path planning host system.

4. The line scribing method according to claim 2, wherein the step (S107) performs the transmission operation via a wireless transmission method.

5. The line scribing method according to claim 1, wherein the steps (S101), (S103), and (S105) are executed by a line scribing path planning host system.

6. The line scribing method according to claim 5, wherein the step (S107) performs the transmission operation via a wireless transmission method.

7. The line scribing method according to claim 1, wherein the step (S107) performs the transmission operation via a wireless transmission method.

* * * * *